United States Patent [19]

Higashi

[11] Patent Number: 4,492,901
[45] Date of Patent: Jan. 8, 1985

[54] CONTROL SYSTEM FOR SYNCHRONIZING COMBINATION PRESS LINE

[75] Inventor: Yoshihiro Higashi, Nonoichi, Japan

[73] Assignee: Kabushiki Kaisha Komatsu Seisakusho, Tokyo, Japan

[21] Appl. No.: 382,642

[22] Filed: May 27, 1982

[30] Foreign Application Priority Data

May 29, 1981 [JP] Japan .................. 56-80801

[51] Int. Cl.³ .............................. H02P 5/46
[52] U.S. Cl. ...................... 318/85; 318/72; 318/73; 318/70; 318/654; 318/655
[58] Field of Search ............ 318/72, 73, 70, 85, 318/654, 655

[56] References Cited

U.S. PATENT DOCUMENTS

| | | | |
|---|---|---|---|
| 2,619,733 | 12/1952 | Horton et al. | 318/655 X |
| 3,073,997 | 1/1963 | Tagliasacchi | 318/85 |
| 3,199,439 | 8/1965 | Danly | 318/85 X |
| 3,557,686 | 1/1971 | Sapolsky | 318/85 X |
| 3,621,348 | 11/1971 | Uchida et al. | 318/85 X |
| 4,314,185 | 2/1982 | Schneider et al. | 318/85 |

FOREIGN PATENT DOCUMENTS 55-56489  4/1980  Japan .................. 318/85

Primary Examiner—J. V. Truhe
Assistant Examiner—Paul Shik Luen Ip
Attorney, Agent, or Firm—Armstrong, Nikaido, Marmelstein & Kubovcik

[57] ABSTRACT

A control system for synchronizing a combination press line comprised of a transfer press and a double-action press.

The transfer press is set as a master press and the double-action press as a slave press following the transfer press in operation.

The transfer and double-action press each has a synchro coupled to respective drive shafts for detecting an angular position of each press. A comparator is provided for comparing signals from both synchros and generating a signal corresponding to a difference between signals from both synchros. The output signal from the comparator is fed only to a motor for the double-action press for controlling the speed of the motor, thus enabling the double-action press to follow the transfer press in operation.

3 Claims, 2 Drawing Figures

CONTROL SYSTEM FOR SYNCHRONIZING COMBINATION PRESS LINE

BACKGROUND OF THE INVENTION

This invention relates to a control system for synchronizing a combination press line which is comprised of a transfer press and a double-action press.

In a combination press line comprised of a transfer press and a double-action press, in order to achieve an automatic operation of the press line it is necessary to synchronize press cycles of both presses because there exists a mutual interference range between an unloader of the double-action press and transfer feed bars of the transfer press. Since the combination press line of the type described above is new in the field, there has been no system for synchronizing the particular combination press line. There have been disclosed, however, many ways for synchronizing the operation of a series of presses which usually include several presses but not a transfer press.

One of such systems is disclosed in U.S. Pat. No. 3,199,439 to J. C. Danly. The system disclosed in this patent employs a master control means having a variable speed motor independent of presses in the press line and all the presses are to be synchronized with the movement of the variable speed motor. Therefore there is no master-slave arrangement among the presses in this patent, rather all the presses are considered to be slaves to the master control means provided outside of and independent of the presses. The master-slave arrangement referred to in the specification means that one of the presses in the press line is selected as the master and all of the other presses follow it as slaves.

In this control system, however, because the master control means provided independent of any presses in the press line controls synchronization of the press line, even if synchronization allowance between two presses is plus or minus 20° of cycle, each press must be operated with synchronization allowance being plus or minus 10° of cycle with respect to the master control means in order to avoid interference between the two presses. That is, synchronization allowance is slashed to half in this kind of control system wherein no master-slave arrangement is employed.

Therefore the system must employ more complicated and sophisticated arrangements leading to an expensive overall control system.

Moreover, since the variable speed motor of the master control means rotates at a constant speed, it is necessary for main motors of the presses in the press line to have powers 1.5 to 1.8 times bigger than those required to drive presses in order to follow the master control means.

There have also been known control systems for synchronizing the operation of a series of presses taking master-slave arrangements.

It should be recognized, however, that those control systems are specifically adapted for controlling a series of presses in a press line and not adapted for controlling a combination press line having a transfer press and a double-action press.

SUMMARY OF THE INVENTION

It is therefore an object of the present invention to provide a control system for synchronizing a combination press line comprised of a transfer press and a double-action press which overcomes the above noted problems.

Another object of the present invention is to provide a control system for synchronizing a combination press line which is simple in construction yet can provide a reliable synchronization of the combination press line.

In accordance with an aspect of the present invention, there is provided a control system for synchronizing a press line comprised of a transfer press and a double-action press, said transfer press including a first motor and a first drive shaft and said double-action press including a second motor and a second drive shaft, said control system comprising: first detector means coupled to said first drive shaft for detecting an angular position of said transfer press in a press cycle and transmitting a first signal corresponding to the angular position thereof; seond detector means coupled to said second drive shaft for detecting an angular position of said double-action press in the same press cycle and transmitting a second signal corresponding to the angular position thereof; and means for comparing said first and second signals and generating a third signal corresponding to a difference between said first and second signals, said third signal being fed only to said second motor for controlling the speed thereof.

The above and other objects, features and advantages of the present invention will be readily apparent from the following description taken in conjunction with the accompanying drawings.

BRIEF DISCRIPTION OF THE DRAWINGS

FIG. 1 is a schematical representation of a combination press line comprised of a transfer press and a double-action press; and FIG. 2 is a control circuit for synchronizing the combination press line according to the present invention.

DESCRIPTION OF THE PREFERRED EMBODIMENT

Figures 1, 2:
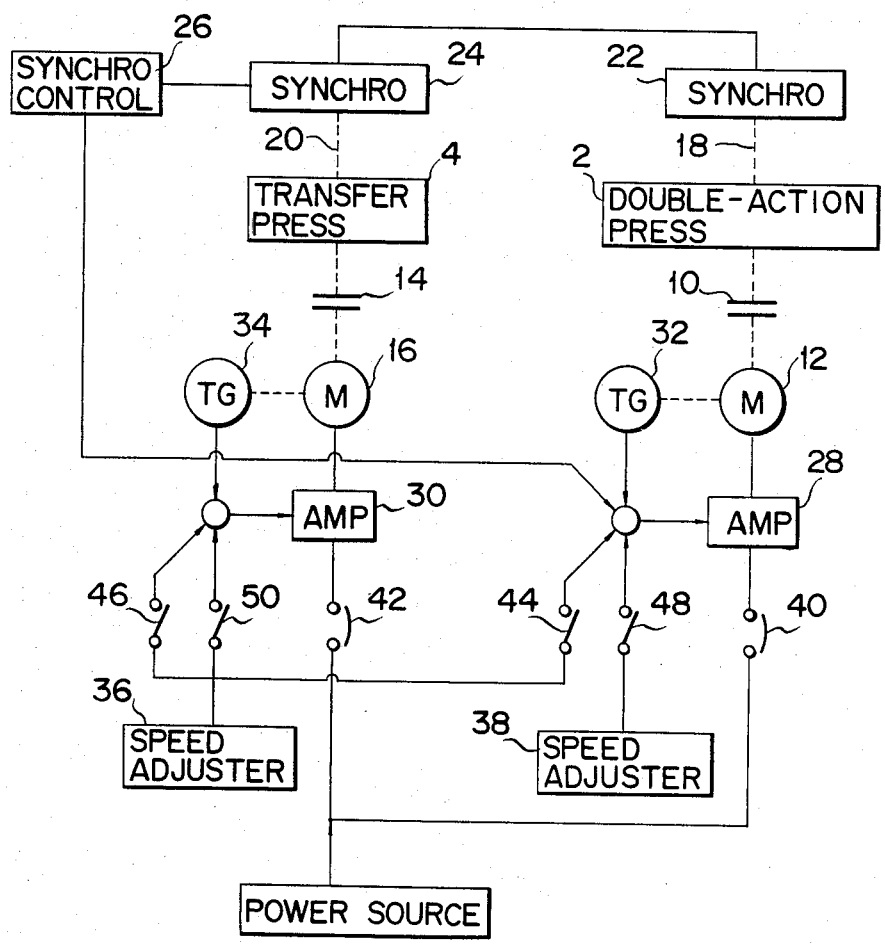

The present invention will now be described in detail below with reference to the accompanying drawings.

Referring to FIG. 1 showing schematically a combination press line to which a control system according to the present invention is adapted. The combination press line comprises a double-action press 2 for effecting drawing on a workpiece and a transfer press 4 positioned downstream of the double-action press 2. The transfer press 4 has built therein not only the ability to produce workpieces or parts in a sequence of stamping operations, but also the ability to feed parts, move them from station to station, and eject or transfer them to another operation. Reference numeral 6 denotes an unloading mechanism of the double-action press 2 and 8 transfer feed bars of the transfer press 4.

Referring now to FIG. 2, the double-action press 2 is connected through a clutch 10 to main motor 12 and driven thereby. In a similar manner, the transfer press 4 is connected through a clutch 14 to a main motor 16 and driven thereby. Coupled to drive shafts 18 and 20 of both presses 2 and 4 are synchros 22 and 24. The synchro 22 is adapted to detect an angular position of the double-action press 2 in a press cycle and to transmit a signal corresponding to the angular position thereof while the synchro 24 is adapted to detect an angular position of the transfer press 4 in the same press cycle and to transmit a signal corresponding to the angular position thereof.

A signal corresponding to angular difference between the synchros 22 and 24 is fed into a synchronization control means 26 which in turn generates an output signal for correcting angular position of press cycle. The output signal from the synchronization control means 26 is fed only into the main motor 12 through an amplifier 28 for accelerating or decelerating the speed of the main motor 12. Therefore the speed of the main motor 16 of the transfer press 4 is not influenced by the signal from the synchronization control means 26.

Reference numeral 30 represents another amplifier. Speeds of the main motors 12 and 16 can be detected by tachogenerators 32 and 34, respectively. A speed adjuster 36 adjusts and sets speeds of both main motors 12 and 16 whereas another speed adjuster 38 controls only the main motor 12. Reference numerals 40 and 42 denote starter switches, 44 and 46 switches for automatic operation, and 48 and 50 switches for manual operation.

In operation when the starter switches 40 and 42 are turned on, the main motors 12 and 16 are started to rotate and the clutches 10 and 14 are engaged thereby putting both the double-action press 2 and the transfer press 4 in operation. At the same time the switches 44 and 46 for automatic operation are closed and a speed command signal set by the speed adjuster 36 is fed into the main motors 12 and 16 through the amplifiers 28 and 30. As a result both the presses 2 and 4 operate in synchronism with each other at a speed set by the speed adjuster 36.

Since the transfer press 4 is arranged as a master press or a reference press, even when operating speed of the transfer press 4 changes, no correction is effected to the speed of the transfer press 4. On the other hand, when there arises difference in speed between the two presses 2 and 4, angular difference of cycle will be detected by the synchros 22 and 24 and a signal corresponding to angular difference therebetween will be fed into the synchronization control means 26 which in turn generates an output signal for correcting angular position of press cycle. The output signal from the synchronization control means 26 is fed only into the main motor 12 through the amplifier 28 for accelerating or decelerating the speed of the main motor 12 thereby synchronizing the operation of the double-action press 2 with that of the transfer press 4.

Since the transfer press 4 is arranged as a master press and the double-action press 2 follows the transfer press 4 as a slave, wider range of synchronization allowance can be obtained between the two presses as compared with a control system wherein a master control means is provided independent of any presses in a press line and operating cycle of all the presses is controlled by the master control means.

Furthermore, according to the arrangement of the present invention power loss can be reduced because it is not necessary for the transfer press 4 to have power for following or catching up the master control means in addition to the power required for operation thereof.

What is claimed is:

1. A control system for synchronizing a press line comprised of a transfer press and a double-action press, said transfer press including a first motor and a first drive shaft and said double-action press including a second motor and a second drive shaft, said control system comprising:
   first detector means coupled to said first drive shaft for detecting an angular position of said transfer press in a press cycle and transmitting a first signal corresponding to the angular position thereof;
   second detector means coupled to said second drive shaft for detecting an angular position of said double-action press in the same press cycle and transmitting a second signal corresponding to the angular position thereof; and
   means for comparing said first and second signals and generating a third signal corresponding to a difference between said first and second signals, said third signal being fed only to said second motor for controlling the speed thereof.

2. A control system according to claim 1 wherein said first and second detector means each comprises a synchro.

3. A control system according to claim 1 or 2 further comprising means for simultaneously changing speed of said first and second motors.

* * * * *